(12) United States Patent
Ramsey et al.

(10) Patent No.: US 7,320,347 B2
(45) Date of Patent: Jan. 22, 2008

(54) INFLATION AND DEFLATION APPARATUS

(75) Inventors: J. William Ramsey, Benton, AR (US); Mike L. Smith, Benton, AR (US); James C. Hobbs, Benton, AR (US)

(73) Assignee: Sunrise Arkansas, Inc., Benton, AR (US)

( * ) Notice: Subject to any disclaimer, the term of this patent is extended or adjusted under 35 U.S.C. 154(b) by 268 days.

(21) Appl. No.: 11/236,168

(22) Filed: Sep. 27, 2005

(65) Prior Publication Data

US 2006/0037643 A1    Feb. 23, 2006

Related U.S. Application Data

(63) Continuation-in-part of application No. 10/817,356, filed on Apr. 2, 2004, now Pat. No. 7,073,545.

(60) Provisional application No. 60/511,047, filed on Oct. 14, 2003.

(51) Int. Cl.
*B65B 1/04* (2006.01)

(52) U.S. Cl. .......................... 141/285; 141/38; 141/65; 141/114; 141/302; 137/228

(58) Field of Classification Search .................... 141/4, 141/10, 38, 65–68, 83, 94–96, 114; 137/226, 137/228

See application file for complete search history.

(56) References Cited

U.S. PATENT DOCUMENTS

| | | | |
|---|---|---|---|
| 2,869,573 A * | 1/1959 | Stafford | 137/223 |
| 3,591,314 A | 7/1971 | Day | |
| 4,412,568 A | 11/1983 | Hughes | |
| 4,574,851 A | 3/1986 | Lepisto | |
| 5,437,301 A | 8/1995 | Ramsey | |
| 5,439,032 A | 8/1995 | Petrone | |
| 5,454,407 A | 10/1995 | Huza et al. | |
| 5,566,728 A * | 10/1996 | Lange | 141/10 |
| 5,692,768 A | 12/1997 | Mihm et al. | |
| 5,806,110 A | 9/1998 | Kunz et al. | |
| 5,806,572 A * | 9/1998 | Voller | 141/10 |
| 5,906,227 A * | 5/1999 | Sowry | 141/65 |
| 5,947,168 A | 9/1999 | Viard | |
| 6,053,222 A | 4/2000 | Peters | |
| 6,516,536 B2 | 2/2003 | Ryden | |
| 7,073,545 B2 * | 7/2006 | Smith et al. | 141/285 |

OTHER PUBLICATIONS

BLOVAC High Performance Industrial Multi-Purpose Blow & Vacuum (product packaging); Blovac efficient and safe air products, P.O. Box 1395, Southport, Qld. 4215 Australia.

* cited by examiner

*Primary Examiner*—Timothy L. Maust
(74) *Attorney, Agent, or Firm*—J. Charles Dougherty

(57) ABSTRACT

A tool allowing both the inflation and deflation of air-filled bags such as dunnage bags is disclosed. The tool comprises a sliding control to easily and safely turn the flow of air on and off. The tool is switched from inflation to deflation mode by moving the bag connecting valve from one end of the device to the other.

20 Claims, 5 Drawing Sheets

INFLATION AND DEFLATION APPARATUS

CROSS-REFERENCE TO RELATED APPLICATIONS

This application is a continuation-in-part of U.S. utility patent application Ser. No. 10/817,356, filed on Apr. 2, 2004 now U.S. Pat No. 7,073,545, and entitled "Inflation and Deflation Apparatus," which in turn claimed priority from U.S. provisional patent application no. 60/511,047, filed on Oct. 14, 2003, and entitled "Inflation and Deflation Apparatus." Both of these applications are incorporated wherein by reference.

BACKGROUND OF THE INVENTION

The present invention relates to an apparatus for the inflation and deflation of air-filled bags, such as the dunnage bags commonly used to cushion cargo loads in truck trailers, railroad cars, and the like.

Inflatable dunnage bags are a common means of cushioning loads shipped via truck trailer, railroad car, or other typical shipping container, particularly where the cargo only partially fills the container and shifting during transport might cause damage. Typical dunnage bags in use today are constructed of one or more layers of paper surrounding a plastic lining. The paper serves to protect the bags from tearing, and thus a greater number of layers may be used in applications where the risk of damage to the dunnage bag is greater. A valve for filling the dunnage bag, usually constructed of plastic, is attached through a hole cut in the bag during manufacture. The bags are shipped flat from the manufacturer, and must be inflated by shipping personnel as containers are loaded with cargo.

The tools currently in use to fill dunnage bags with air are often simply converted tire inflation tools, which are attached to a hose leading from a source of compressed air. Some specialized tools are available for dunnage bag deflation, such as taught by U.S. Pat. No. 5,437,301 to Ramsey. In the use of such devices, the bag is first placed in the space that it will occupy as cargo is loaded into a container, and the inflation device is attached to the bag valve. The bag is then filled with air. until an appropriate air pressure within the bag is achieved. The inflation tool may connect with the bag valve through a ball-lock quick-disconnect attachment, which may be engaged and disengaged by simply sliding a ring on the attachment point up or down. Filling is thus a relatively simple operation, requiring only a few seconds of the operator's time.

A significant limitation of the current inflation tools is that they present no way to rapidly deflate a dunnage bag once the cargo is ready to be unloaded. The valve assembly in some such bags may be unscrewed to release air pressure within the bag, but because the bags are fairly rigid (owing to the protective paper covering) they tend not collapse simply due to the equalization of air pressure inside and outside of the bag. The bags cannot be quickly and conveniently reduced to a flat configuration such as they are shipped from the manufacturer. As a result, the standard industry practice is for shipping and receiving personnel to simply cut the bags with a utility knife in order to deflate them quickly for removal.

Dunnage bags are not reusable once cut, and thus they are generally considered to be a one-use, disposable commodity. Significant cost savings could be realized by the reuse of these dunnage bags. This could be rendered practical by devising a means to rapidly and easily deflate a dunnage bag without damaging the dunnage bag. The bags must be restored to the flat shape they held prior to their original use, so that they can be easily and compactly stored.

The prior art does include previous attempts to develop deflation tools for dunnage bags. U.S. Pat. No. 5,437,301 to Ramsey, discussed above, teaches a rotating valve actuator that selectively allows the flow of compressed air across an air passage connected to the dunnage bag in order to facilitate deflation. U.S. Pat. No. 6,053,222 to Peters teaches a dunnage bag deflation tool that uses a high-pressure air source to open the dunnage bag air valve, thereby allowing deflation, and also suck air out of the bag by discharging the air through a venturi tube. A venturi tube in its simplest form is an air passage with a region of restricted diameter. According to the Bernoulli inverse relationship between air velocity and pressure, passage of air through the restricted region of a venturi tube creates a low-pressure region. This low-pressure region results in a negative pressure or suction effect that may be used to draw air out of an attached container. Peters teaches two different embodiments of the deflation device, which differ by the means through which the device may be switched from inflation to deflation mode. One device calls for the operator to simply place a thumb over the venturi tube exit, thereby blocking that means of egress for the high-pressure air and directing the high-pressure air into the bag. The other embodiment incorporates a manually set bi-stable switch set at the entrance to the venturi tube, which prevents air from ever entering the venturi tube and thus forcing high-pressure air in the direction of the dunnage bag valve.

U.S. Pat. No. 5,454,407 to Huza et al. teaches another apparatus to both inflate and deflate a dunnage bag. This device incorporates the venturi effect as part of an automatic pressure sensing system, but relies on hand pressure directly to the dunnage bag for deflation. Other devices to inflate and deflate different types of chambers are known in the art, such as that taught by U.S. Pat. No. 5,947,168 to Viard for inflation and deflation of an air mattress.

Each of these devices suffers from important limitations. While the Peters device allows for the inflation and deflation of a dunnage bag using an integrated tool, its control mechanisms are of limited practicality. The operator of such a device should ideally be able to quickly turn on and off the source of high-pressure air, and quickly adjust the mode setting of the device to either inflate or deflate a dunnage bag. Ideally, the necessary controls would be simple and easily manipulated. The use of the operator's thumb to maintain the Peters device in the inflation mode would quickly result in operator fatigue. Given the large number of cargo containers that may be loaded and unloaded in a typical shipping facility during an operator's work shift, this rudimentary control mechanism would quickly prove unworkable. The use of a switch at the entrance of the venturi tube is an improvement, but because of its design and position on the device would be prone to failure. Furthermore, the overall design of the device lacks any means of dissipating or quieting the flow of high-pressure air out of the venturi tube during deflation of a dunnage bag; it would result in a violent burst of air moving directly toward the operator. This situation raises significant safety concerns. The air escaping in this manner would also create a great deal of noise, which may be not only uncomfortable for the operator but also may raise a safety issue itself. Finally, the design of the device does not incorporate any convenient means of holding the device during inflation and deflation; this is an important safety concern as well, since if the valve connection should fail then the device would be propelled backward at great speed due to force of air. In this situation, the device would likely swing in an arc due to the attached (but flexible) air hose, and could strike the operator or a bystander with great force, potentially causing severe injury or property damage.

The limitations of the prior art are overcome by the present invention as described below.

BRIEF SUMMARY OF THE INVENTION

The present invention comprises an inflation and deflation device with a control mechanism and operational features that make it convenient, practical, and safe for use by operating personnel. Switching of the device from an inflation to a deflation mode is achieved by merely switching the position of the dunnage valve bag connector fitting from one end of the device to the other. Air flow is turned on or off by sliding a control mechanism near the handle of the device, which provides a sure grip for the operator. This mechanism results is a simple and reliable means by which the operator may change the mode of operation of the device. Air exiting the device is muffled through the barrel and is directed away from the operator. This device both reduces the likelihood of injury to the operator due to a violent rush of air during deflation, and also dampens the noise created by air rushing out of the device during deflation.

It is therefore an object of the present invention to provide for a single, integrated tool for the inflation and deflation of dunnage bags and like containers.

It is a further object of the present invention to provide a device for the inflation and deflation of air-filled bags with a simple means for inflation/deflation selection and a simple means of turning on and off the flow of air to the device.

It is also an object of the present invention to provide a device for the inflation and deflation of air-filled bags that disperses air ejected from the device during deflation mode away from the operator.

It is also an object of the present invention to provide a device for the inflation and deflation of air-filled bags that improves on the safety of existing devices.

It is also an object of the present invention to provide a device that reduces the noise created by the flow of air from the device during deflation mode.

These and other features, objects and advantages of the present invention will become better understood from a consideration of the following detailed description of the preferred embodiments and appended claims in conjunction with the drawings as described following.

DETAILED DESCRIPTION OF THE INVENTION

Figure 1:
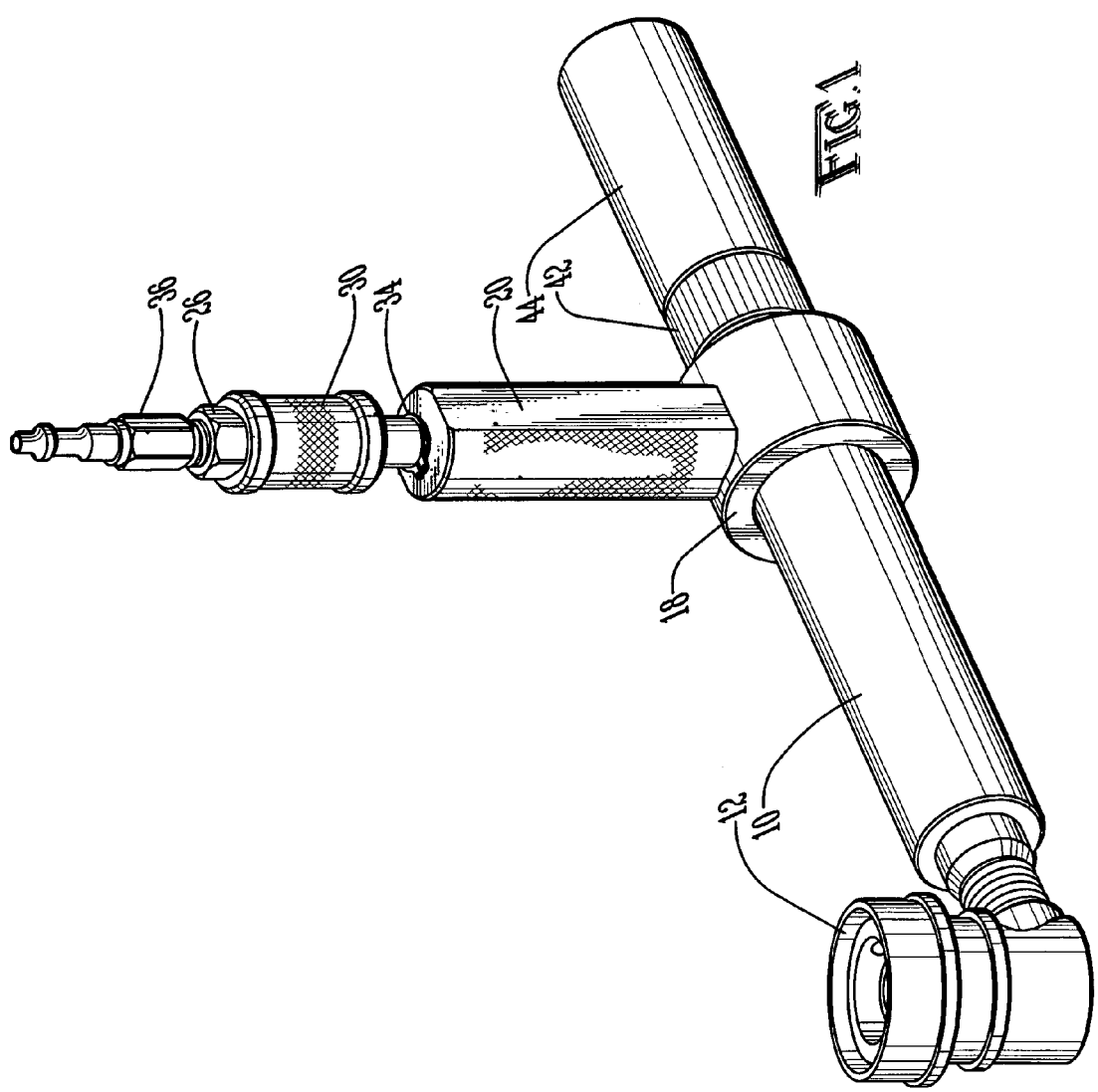
FIG. 1 is a perspective view of a preferred embodiment of the present invention.
Figure 2:
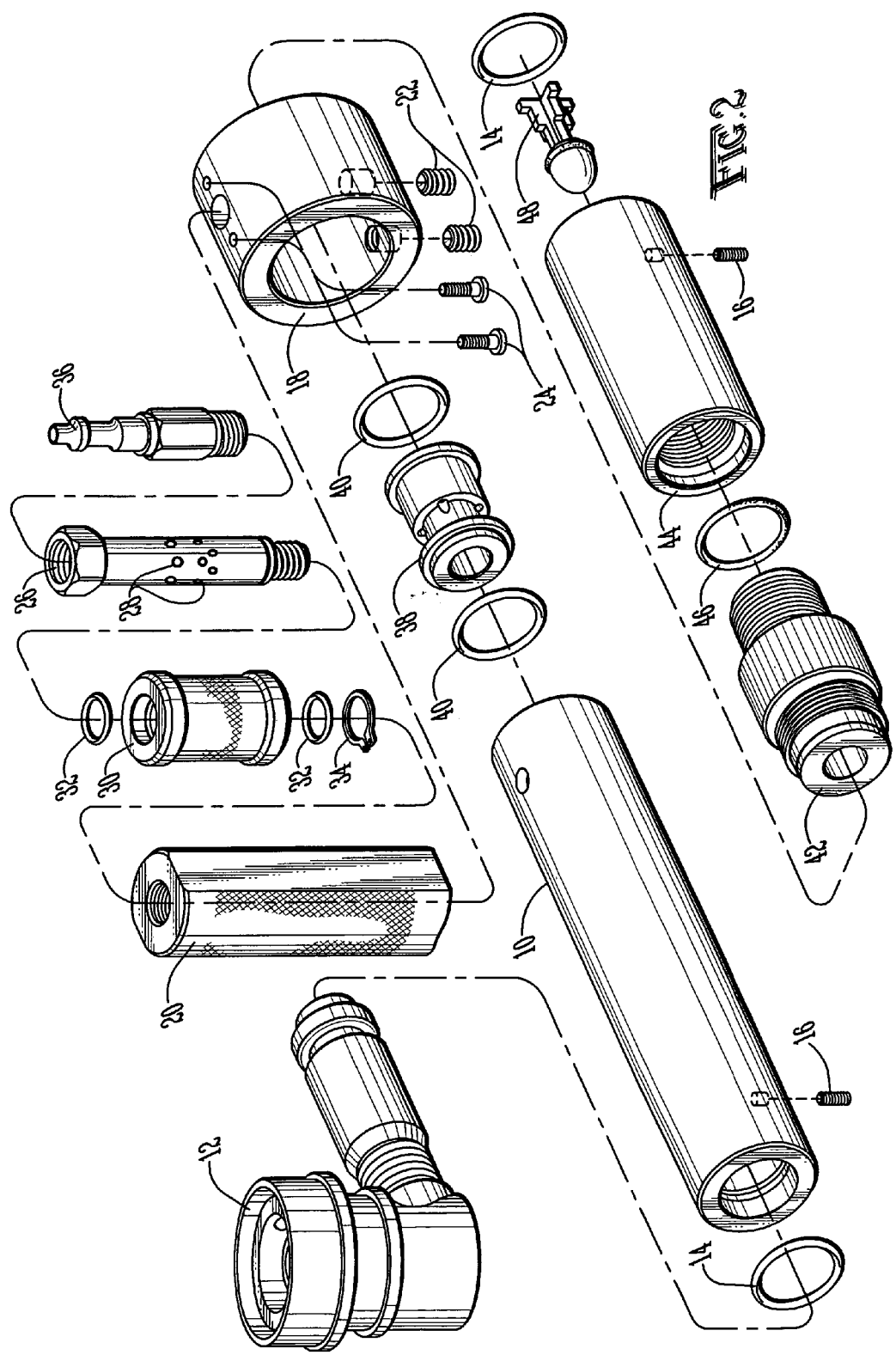
FIG. 2 is an exploded perspective. view of a preferred embodiment of the present invention.

Referring to FIGS. 1 and 2, the major components of a preferred embodiment of the present invention may now be described. Inflation barrel 10 comprises a tube with an open bore. Removably attached to inflation barrel 10 in the "inflation" configuration, as depicted in FIGS. 1 and 2, is valve connector assembly 12. Valve connector assembly 12 is fashioned so as to provide a selectively lockable and unlockable engagement with a dunnage bag inflation valve (not shown). The valve connector assembly 12 may preferably be constructed as a ball-lock quick-disconnect valve connector as described in U.S. Pat. No. 5,437,301 to Ramsey, which is incorporated herein by reference. o-rings 14 is seated within an annular groove on the interior of inflation barrel 10, thereby providing an airtight seal between inflation barrel 10 and valve connector assembly 12. In the preferred embodiment, valve assembly 12 is held in place by set screw 16. Set screw 16 extends through a hole in the side of inflation barrel 10 and part-way into the interior of inflation barrel 10. As valve connector assembly 12 is inserted into inflation barrel 10, a notch in the interior end of valve connector assembly 12 must be aligned with set screw 12 in order for valve connector assembly 12 to be fully seated. Once engaged, valve connector assembly 12 may be turned with respect to inflation barrel 10, whereby set screw 16 extends into the groove near the end of that portion of valve assembly 12 that extends within inflation barrel 10. Valve assembly 12 may not be removed until it is again turned with respect to inflation barrel 10 such that the notch of valve assembly 12 and set screw 16 are aligned.

Body 18 is of a generally annular shape, and receives inflation barrel 10 through its interior, holding inflation barrel 10 in place by means of set screws 22. In the preferred embodiment, inflation barrel 10 extends completely through body 18 and extends slightly from the opposite side of body 18. Attached to body 18 by means of screws 24 is handle 20. Handle 20 is hollow to allow air flow, as will be explained following, but is preferably of an ergonomic shape on its exterior. The purpose of handle 20 is to allow the operator to maintain a firm grip on the device during use, and thus cross-hatching or other means may preferably be used to improve the ability of a user to grip the device at handle 20. At its distal end, handle 20 includes female threads to receive air passage 26. Air passage 26, preferably constructed of steel or brass for strength, controls the passage of air from an air hose (not shown) into the device. Air passage 26 comprises two rows of air holes 28 passing through the walls of air passage 26, and a barrier (not shown in FIG. 1 but illustrated in FIGS. 5 and 6 as will be described below) that blocks the passage of air through air passage 26 between the rows of air holes 28. In the preferred embodiment, the barrier is formed of a single piece of metal as air passage 26; the barrier is formed by machining the hollow center of air passage 26 using two bores drilled toward each other but not quite meeting in the middle of air passage 26.

Fitted slideably over air passage 26 is annular slide 30. Slide 30 comprises slots on its interior to receive two o-rings 32, one positioned towards each end of slide 30. Slide 30 has freedom of movement in a longitudinal direction with respect to air passage 26. In the preferred embodiment, slide 30's longitudinal movement is blocked near the distal end of air passage 26 by a flared end designed to receive a standard wrench, and blocked near the proximal end of air passage 26 by a keeper 34, which is fitted into a slot sized to receive it on the exterior of air passage 26. Fitted into the female threads at the distal end of air passage 26 is air fitting 36, which is designed to receive a hose fitting of the standard quick-disconnect type as commonly employed for equipment supplying pressurized air.

Again referring to FIG. 2, fitted annularly within the bore of inflation barrel 10 is air distributor 38. Distributor o-rings 40 are placed neither either end of distributor 38 to block the flow of air around either end of distributor 38 at the inner wall of the bore of inflation barrel 10. Distributor 38 further comprises a number of distributor inlets (not shown); the preferred embodiment comprises six distributor inlets, but alternative embodiments may include any number of such inlets. The distributor inlets are preferably located at the edge of the base of the truncated cone formed by the inner portion of distributor 38. As will be explained more fully below, air may pass through inflation barrel 10 through the inlets of distributor 38 and thereby pass through the device.

Deflation barrel fitting 42 is threaded into inflation barrel 10 at the end extending slightly from body 18. Deflation barrel fitting 42 comprises a hollow air passage that gradually widens as it extends away from body 18. Deflation barrel fitting 42 achieves an air-tight fit with inflation barrel 10 because it sits against the o-ring 40 that is fitted at the adjacent end of distributor 38 o-ring 46 is fitted at the other end of deflation barrel fitting 42, at the point where deflation barrel 44 threadably fits onto deflation barrel fitting 42. Thus an air-tight fit is achieved at each end of deflation barrel fitting 42. Like deflation barrel fitting 42, deflation barrel 44 comprises a hollow air passage at its interior. This passage, however, is wider and straight-sided in that portion of deflation barrel 44 furthest from deflation barrel fitting 42, but is sized down at the opposite end and shaped to receive valve 48. Valve 48 is capable of sliding over a short distance within deflation barrel 44, for reasons as will be explained in the discussion of the operation of the device following. A set screw 16 extends transversely through deflation barrel 44 near its distal end, in a position congruent with that of the set screw 16 fitted into inflation barrel 10, and similarly an o-ring 14 is fitted in a groove at the interior and near the distal end of deflation barrel 44, in order to provide an air-tight fit with bag valve connector assembly 12 When the device is operated in deflation mode.

The principal components of the device, including inflation barrel 10, body 18, handle 20, deflation barrel fitting 42, and deflation barrel 44 may be formed of any sufficiently strong, rigid material, the stronger plastics being the preferred material due to their light weight and relatively low manufacturing cost. Likewise, distributor 38 and valve 48 may also be constructed of strong, lightweight materials such as plastics. For purposes of strength, aluminum, brass or other metals are used in the preferred embodiment for the construction of air passage 26 and slide 30. The various o-rings in the preferred embodiment are of the types commonly found commercially, constructed of rubber or a like resilient material.

Figure 5:
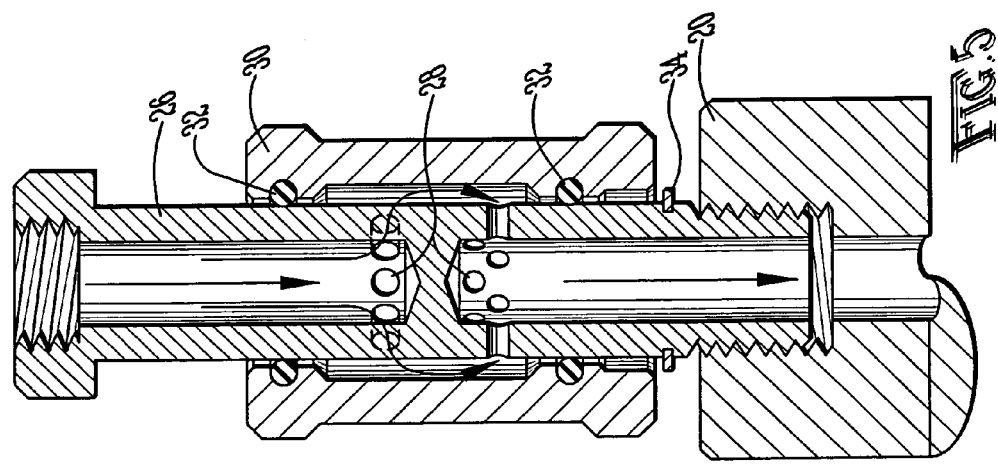
FIG. 5 is a detail cut-away view of a preferred embodiment of the present invention in the "on" configuration.
Figure 6:
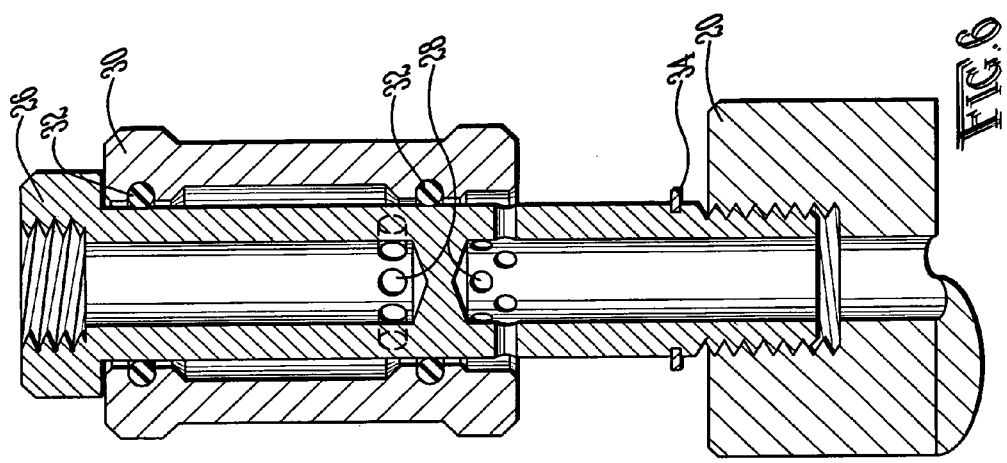
FIG. 6 is a detail cut-away view of a preferred embodiment of the present invention in the "off" configuration.

Referring now to FIGS. 5 and 6, the method of turning a preferred embodiment of the present invention "on" and "off" (that is, allowing the flow of compressed air through the device or stopping the flow of compressed air through the device) may be described. FIG. 5 depicts the device in the "on" position, with the arrows indicating the path of air flow through the device, and FIG. 6 depicts the device in the "off" position. It may be seen that sliding slide 30 towards the distal end of air passage 26 causes the flow of air to be interrupted. Since the inner hollow section of air passage 26 does not pass completely through air passage 26, air must flow out through one row of air holes 28 and then back in through the other row of air holes 28 in order to reach the proximal end of air passage 26. As shown in FIG. 6, the distal row of air passages 28 are cut off from the proximal row of air holes 28 by slide 30 and associated o-rings 32. In FIG. 5, however, when slide 30 is in the "open" position, air may flow into air passage 26, out through the distal row of air holes 28, into the cavity formed by the space between the outer surface of air passage 26 and the inner surface of slide 30, then back into air passage 26 through the lower row of air holes 28. From this point, the air may flow into handle 20 and on through the device. As previously discussed, the travel of slide 30 is limited by air passage 26 at its distal end and by keeper 34 at the proximal end of air passage 26.

Figure 3:
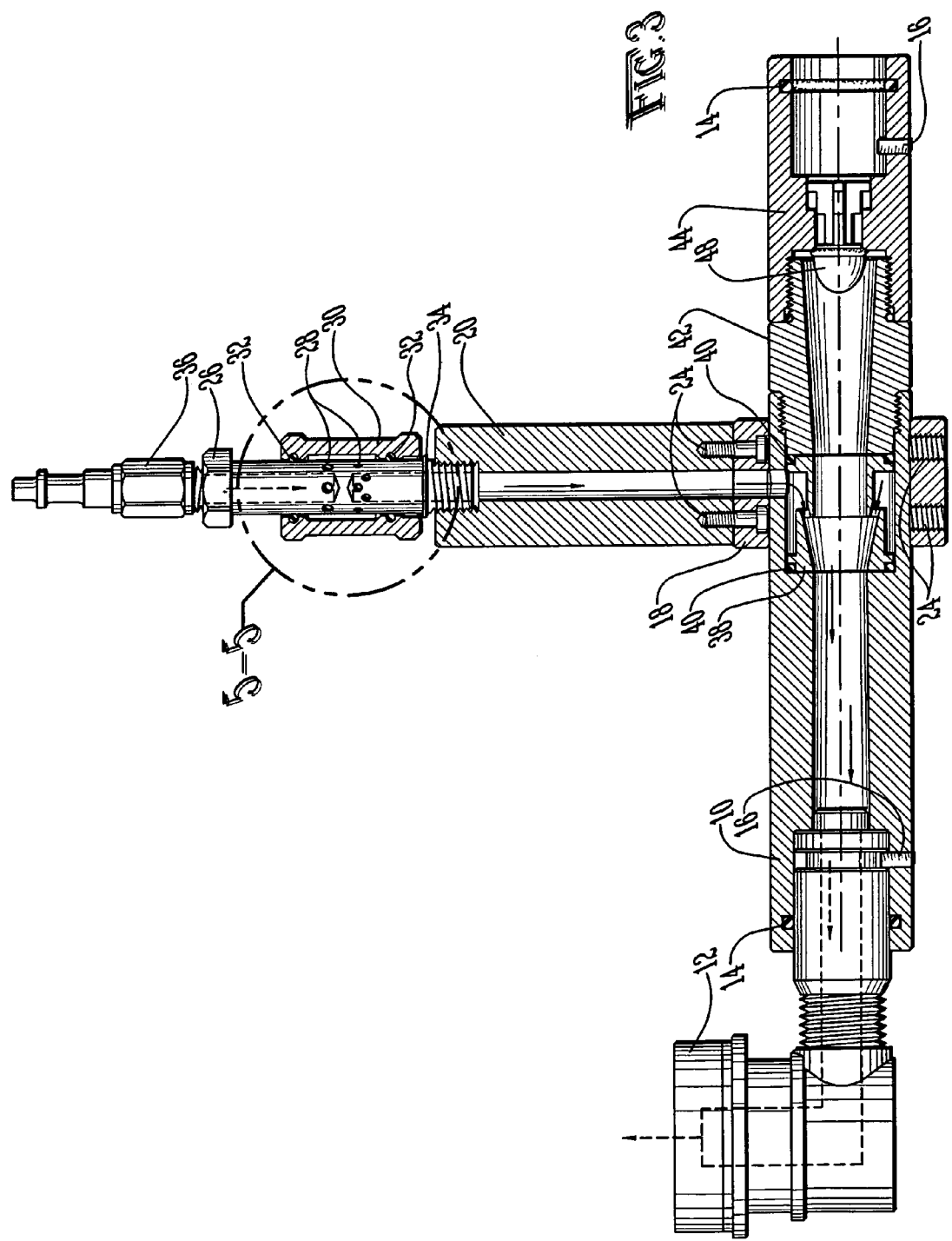
FIG. 3 is a partial cut-away elevational view of a preferred embodiment of the present invention in the "inflation" configuration.
Figure 4:
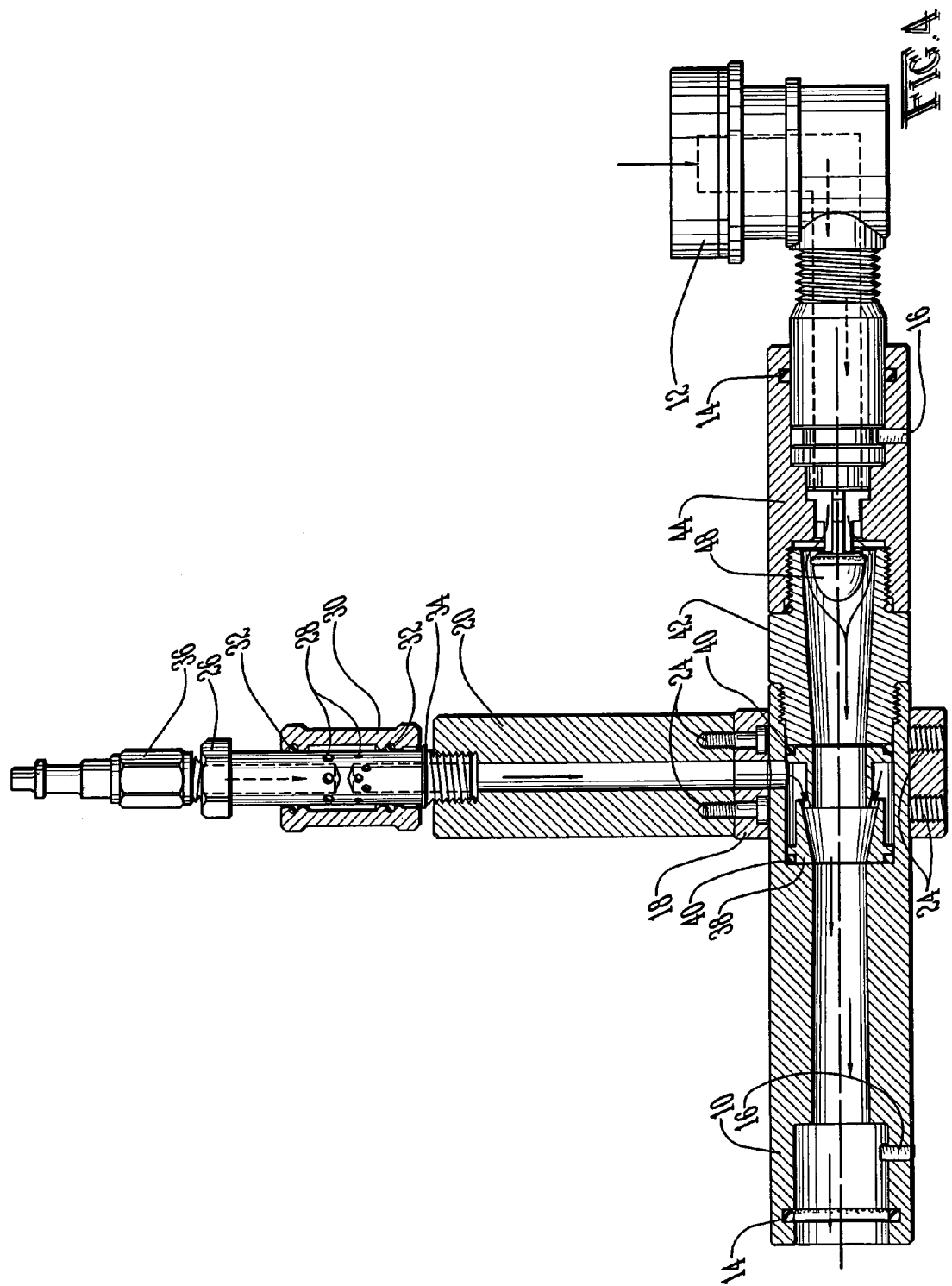
FIG. 4 is a cut-away view of the preferred embodiment of the present invention in the "deflation" configuration.

Referring now to FIGS. 3 and 4, the method of operating the preferred embodiment of the invention in inflation mode and deflation mode may now be described. The device is shown in inflation mode in FIG. 3. Bag valve connector assembly 12 is fitted at the end of inflation barrel 10, held in place by set screw 16. Air flows from air passage 26 as described above, entering handle 20. Air then flows through an opening in body 18, through a matching opening in inflation barrel 10, and into a cavity between the outer surface of distributor 38 and the hollow interior of inflation barrel 10. The inlets of distributor 38 allow air to pass through distributor 38, into inflation barrel 10, and then into bag valve connector assembly 12. Air may then pass into the bag to be filled from that point when the bag valve is connected to the device. Air pressure formed within deflation barrel fitting 42 forces valve 48 to move away from body 18, thereby closing and sealing the opening through deflation barrel 44.

FIG. 4 depicts the preferred embodiment of the invention in deflation mode. In this mode, bag valve connector assembly 12 is fitted not to inflation barrel 10, but to deflation barrel 44. Again, bag valve connector assembly 12 is preferably held in place by a set screw 16. Air flows from air passage 26 as described above entering handle 20. Air then flows through an opening in body 18, through a matching opening in inflation barrel 10, and into a cavity between the outer surface of distributor 38 and the hollow interior of inflation barrel 10. The inlets of distributor 38 allow air to pass through distributor 38, into inflation barrel 10, and then exit the device. The length of inflation barrel 10 serves to muffle the sound of air exiting the device, and also directs the air away from the operator to avoid injury.

Air is drawn from the dunnage bag through bag valve connector assembly 12 and into deflation barrel 44 because the insertion of bag valve connector assembly 12 forces valve 48 into the open position. As illustrated in FIG. 4, the end of bag valve connector assembly 12 pushed against the distal end of valve 48, forcing it toward body 18. This prevents the closure of valve 48 due to air pressure within deflation barrel fitting 42. Furthermore, air is drawn from the dunnage bag, by way of bag valve connector assembly 12, deflation barrel 44, and deflation barrel fitting 42, due to the venturi effect created by distributor 38. As may be noted in FIG. 4, distributor 38 includes a cone-shaped section that functions according to the well-known Bernoulli principle, creating a negative air pressure in the region behind distributor 38. Thus the device creates a suction that draws air from the dunnage bag, along with the pressurized air entering the device at air fitting 36, through inflation barrel 10 and out of the device. Using typical compressed-air sources such as industrial-sized air compressors, the preferred embodiment of the device is capable of reducing a standard-sized dunnage bag to a flat shape appropriate for storage and reuse in only a few seconds.

The present invention has been described with reference to certain preferred and alternative embodiments that are intended to be exemplary only and not limiting to the full scope of the present invention as set forth in the appended claims.

What is claimed is:

1. An inflation and deflation apparatus, comprising:
   (a) a first barrel and a second barrel;
   (b) a compressed air inlet in communication with at least one of said first and second barrels;
   (c) an outlet valve assembly adaptable to connect to each of said first and second barrels, whereby air may pass through said compressed air inlet to said outlet valve assembly through said first barrel when said outlet valve assembly is connected to said first barrel and air may pass through said second compressed air outlet to said outlet valve assembly through said second barrel when said outlet valve assembly is connected to said second barrel; and
   (d) a second barrel valve in communication with said second barrel, wherein said second barrel valve is adaptable to close when said outlet valve assembly is not connected to said second barrel, and said second barrel valve is held open when said outlet valve assembly is connected to said second barrel.

2. The apparatus of claim 1, wherein said second barrel valve is adaptable to slide longitudinally within said second barrel in response to air pressure from said air inlet.

3. The apparatus of claim 2, wherein said second barrel valve is disposed within said second barrel such that it is adjacent to and in contact with said outlet valve assembly when said outlet valve assembly is connected to said second barrel.

4. The apparatus of claim 1, further comprising an air inlet control operable to open or block a flow of air between said air inlet and at least one of said first and second barrels.

5. The apparatus of claim 4, wherein said air inlet further comprises a plurality of openings and a barrier whereby air may pass through said air inlet only by passing out of at least one of said openings and back through at least one other of said openings, and wherein said air inlet control is operable to alternatively block the passage of air between said openings or allow the passage of air between said openings.

6. The apparatus of claim 5, wherein said air inlet control operates to slide between an open and closed position.

7. The apparatus of claim 1, further comprising a handle comprising an air passage allowing the flow of air between said air inlet and at least one of said first and second barrels.

8. The apparatus of claim 4, further comprising a venturi tube within said first barrel.

9. The apparatus of claim 8, wherein said venturi tube comprises a frustoconical bore.

10. The apparatus of claim 9, further comprising at least one venturi tube inlet passing through said venturi tube and allowing air to flow between said air inlet and said venturi tube bore.

11. An inflation and deflation apparatus, comprising:
   (a) a bore comprising an air passage, said air passage having a first air outlet and a second air outlet;
   (b) an air inlet in communication with said air passage;
   (c) a switch in communication with said air inlet operable to block or open the passage of air from said air inlet into said air passage;
   (d) an outlet valve operable to connect to either of said first air outlet and said second air outlet; and
   (e) an air passage valve in communication with said air passage, wherein said air passage valve is operable to block the flow of air through said second air outlet when said outlet valve is connected to said first air outlet, and said air passage valve is operable to open the flow of air through said second air outlet when said outlet valve is connected to said second air outlet.

12. The apparatus of claim 11, wherein said air passage valve is adaptable to slide longitudinally within said air passage in response to air pressure from said air inlet.

13. The apparatus of claim 12, wherein said air passage valve is disposed within said air passage such that it is adjacent to and in contact with said outlet valve when said outlet valve is connected to said second outlet.

14. The apparatus of claim 11, wherein said air inlet comprises a plurality of apertures whereby air may pass through air inlet only by passing from said air inlet out of at least one of said apertures and back through at least one other of said apertures and into said air inlet, and wherein said switch is operable to alternatively block the passage of air between said apertures or allow the passage of air between said apertures.

15. The apparatus of claim 14, wherein switch operates to slide between an open and closed position.

16. The apparatus of claim 11, further comprising a handle attached to said air passage and perpendicular to said air passage.

17. The apparatus of claim 13, further comprising a venturi tube within said air passage and further where said venturi tube comprises a frustoconical bore.

18. The apparatus of claim 17, further comprising at least one venturi tube inlet passing through said venturi tube and allowing air to flow between said air inlet and said first outlet.

19. An apparatus for the inflation and deflation of dunnage bags, comprising:
   (a) a first barrel comprising an air passage and an outlet;
   (b) a second barrel comprising an air passage in communication with said first barrel air passage and an outlet;
   (c) a handle comprising an air passage in communication with one of said first and second barrel air passage;
   (d) an inlet comprising an air passage in communication with said handle air passage;
   (e) a switch in communication with said inlet air passage;
   (f) an outlet fitting adaptable to connect with either of said first barrel outlet and said second barrel outlet, said outlet adapted to fit a dunnage bag valve; and
   (g) a deflation valve in communication with said second barrel operable to open or close said second barrel air passage.

20. The apparatus of claim 19, wherein at least one of said first barrel and said second barrel comprises a venturi tube.

* * * * *